United States Patent
Choi et al.

(10) Patent No.: US 12,388,624 B2
(45) Date of Patent: Aug. 12, 2025

(54) APPARATUS AND METHOD FOR SHARING DATA

(71) Applicant: SAMSUNG SDS CO., LTD., Seoul (KR)

(72) Inventors: Kyu-Young Choi, Seoul (KR); Hyo-Jin Yoon, Seoul (KR); Min-Kang Song, Seoul (KR); Seo-Yeon Park, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 346 days.

(21) Appl. No.: 16/664,828

(22) Filed: Oct. 26, 2019

(65) Prior Publication Data

US 2020/0358604 A1 Nov. 12, 2020

Related U.S. Application Data

(60) Provisional application No. 62/844,854, filed on May 8, 2019.

(30) Foreign Application Priority Data

May 8, 2019 (KR) ........................ 10-2019-0053514

(51) Int. Cl.
*H04L 9/08* (2006.01)
*H04L 9/32* (2006.01)
*H04L 9/34* (2006.01)

(52) U.S. Cl.
CPC .......... *H04L 9/0825* (2013.01); *H04L 9/0869* (2013.01); *H04L 9/3247* (2013.01); *H04L 9/34* (2013.01)

(58) Field of Classification Search
CPC . H04L 2209/38; H04L 9/0631; H04L 9/0825; H04L 9/0869; H04L 9/3239; H04L 9/3247; H04L 9/3263; H04L 9/34
See application file for complete search history.

(56) References Cited

U.S. PATENT DOCUMENTS 6,931,532 B1 *  8/2005  Davis .................. G06F 21/6209
                                                                705/76
9,876,646 B2 *  1/2018  Ebrahimi .............. H04L 9/3263
(Continued)

FOREIGN PATENT DOCUMENTS

CN   106779707 A    5/2017
CN   108462568 A    8/2018
(Continued)

OTHER PUBLICATIONS

Search Query Report from IP.com (performed Jul. 29, 2021) (Year: 2021).*

(Continued)

*Primary Examiner* — Sharon S Lynch
(74) *Attorney, Agent, or Firm* — The PL Law Group, PLLC (57) ABSTRACT

An apparatus for sharing data according to one embodiment includes a first combined data generator configured to generate first combined data by combining target data to be shared and a random bit string, a data encryptor configured to generate a ciphertext for the first combined data, a key encryptor configured to generate one or more ciphertexts for a decryption key of the ciphertext for the first combined data using one or more public keys, a second combined data generator configured to generate second combined data by combining the ciphertext for the first combined data, the one or more ciphertexts for the decryption key, and the random bit string, and a data discloser configured to disclose the second combined data to one or more entities to share the target data to be shared.

4 Claims, 7 Drawing Sheets

(56) References Cited

U.S. PATENT DOCUMENTS

| | | | | |
|---|---|---|---|---|
| 10,103,885 B2* | 10/2018 | Davis | | H04L 9/14 |
| 10,341,123 B2* | 7/2019 | Ebrahimi | | H04L 9/3236 |
| 10,498,542 B2* | 12/2019 | Ebrahimi | | G06Q 20/3827 |
| 10,673,617 B1* | 6/2020 | Antoniou | | G06F 13/4282 |
| 10,861,009 B2* | 12/2020 | Lakshmanan | | G06Q 20/3829 |
| 10,979,227 B2* | 4/2021 | Ebrahimi | | H04L 67/146 |
| 11,082,221 B2* | 8/2021 | Ebrahimi | | G06F 21/46 |
| 11,206,133 B2* | 12/2021 | Ebrahimi | | H04L 9/0866 |
| 11,212,094 B2* | 12/2021 | Diaz Vico | | H04L 9/0637 |
| 11,258,582 B2* | 2/2022 | Ramachandran | | H04L 9/0637 |
| 11,323,272 B2* | 5/2022 | Ebrahimi | | H04L 9/3247 |
| 2004/0202322 A1* | 10/2004 | Chavanne | | H04L 9/0637 380/43 |
| 2015/0310431 A1* | 10/2015 | Lakshmanan | | G06Q 20/02 705/71 |
| 2016/0330035 A1* | 11/2016 | Ebrahimi | | H04L 9/3263 |
| 2017/0207917 A1* | 7/2017 | Davis | | H04L 9/3066 |
| 2018/0109508 A1* | 4/2018 | Wall | | H04L 9/0631 |
| 2018/0152304 A1* | 5/2018 | Ebrahimi | | H04L 9/3236 |
| 2018/0227130 A1* | 8/2018 | Ebrahimi | | H04L 9/3236 |
| 2018/0227131 A1* | 8/2018 | Ebrahimi | | H04L 9/0643 |
| 2018/0316492 A1* | 11/2018 | Ramachandran | | H04L 9/085 |
| 2019/0096005 A1* | 3/2019 | Drury | | G06Q 20/227 |
| 2019/0182042 A1* | 6/2019 | Ebrahimi | | H04L 9/3234 |
| 2020/0084027 A1* | 3/2020 | Duchon | | H04L 9/0825 |
| 2020/0127826 A1* | 4/2020 | Ebrahimi | | G06F 21/46 |
| 2020/0127832 A1* | 4/2020 | Ebrahimi | | H04W 12/77 |
| 2020/0267003 A1* | 8/2020 | Ebrahimi | | H04L 9/3297 |
| 2020/0295934 A1* | 9/2020 | Diaz Vico | | H04L 9/14 |
| 2022/0029802 A1* | 1/2022 | Ebrahimi | | G06F 16/2255 |
| 2022/0029807 A1* | 1/2022 | Ebrahimi | | H04L 63/123 |
| 2022/0052846 A1* | 2/2022 | Diaz Vico | | H04L 9/14 |
| 2022/0255737 A1* | 8/2022 | Ebrahimi | | H04L 63/083 |

FOREIGN PATENT DOCUMENTS

| | | | | |
|---|---|---|---|---|
| CN | 108632031 A | | 10/2018 | |
| EP | 1947798 A2 | | 7/2008 | |
| KR | 10-2008-0093635 A | | 10/2008 | |
| KR | 10-1142168 B1 | | 5/2012 | |
| WO | WO 20040/34182 A2 | | 4/2004 | |
| WO | WO 2018/213916 | * | 11/2018 | H04L 9/30 |

OTHER PUBLICATIONS

Search Query Report from IP.com (performed Feb. 4, 2022) (Year: 2022).*

Search Query Report from IP.com (performed Aug. 10, 2022) (Year: 2022).*

Search Query Report from IP.com (performed Dec. 2, 2022) (Year: 2022).*

European Search Report For EP20165865.5 dated Jul. 2, 2020 from European patent office in a counterpart European patent application.

Office action dated Jan. 6, 2022 from China Patent Office in a counterpart China Patent Application No. 202010182375 (all the cited references are listed in this IDS.) (English translation is also submitted herewith.).

Office action issued on Jun. 12, 2023 from Korean Patent Office in a counterpart Korean Patent Application No. 10-2019-0053514 (English translation is also submitted herewith.).

* cited by examiner

APPARATUS AND METHOD FOR SHARING DATA

CROSS-REFERENCE TO RELATED APPLICATION(S)

This application claims the benefit under 35 USC § 119(a) of U.S. Provisional Patent Application No. 62/844,854 filed on May 8, 2019 and Korean Patent Application No. 10-2019-0053514, filed on May 8, 2019, in the Korean Intellectual Property Office, the entire disclosure of which is incorporated herein by reference for all purposes.

BACKGROUND

1. Field

The following description relates to technology for sharing data.

2. Description of Related Art

As a blockchain has recently become an issue, there have been active attempts to apply the blockchain to various fields. A blockchain ensures the integrity of data and the technology is being developed through the trust of the data and sharing of the trusted data, in line with the recent trend of sharing economy.

In a conventional blockchain, data is disclosed and hence data privacy cannot be achieved. To solve such a problem, a private blockchain has been introduced. However, even the private blockchain cannot protect data privacy only for a specific entity because all the entities that have joined in a blockchain network share data therebetween.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for sharing data.

In one general aspect, there is provided an apparatus for sharing data including a first combined data generator configured to generate first combined data by combining target data to be shared and a random bit string; a data encryptor configured to generate a ciphertext for the first combined data; a key encryptor configured to generate one or more ciphertexts for a decryption key of the ciphertext for the first combined data using one or more public keys; a second combined data generator configured to generate second combined data by combining the ciphertext for the first combined data, the one or more ciphertexts for the decryption key, and the random bit string; and a data discloser configured to disclose the second combined data to one or more entities to share the target data to be shared.

The data encryptor may generate the ciphertext for the first combined data using a symmetric key-based encryption algorithm and the decryption key is identical to an encryption key used to generate the ciphertext for the first combined data.

The one or more public keys may be public keys of each of the one or more entities.

The second combined data generator may generate an electronic signature for the second combined data using a secret key and the data discloser may disclose the second combined data and the electronic signature to the one or more entities.

In another general aspect, there is provided a method of sharing data including generating first combined data by combining target data to be shared and a random bit string; generating a ciphertext for the first combined data; generating one or more ciphertexts for a decryption key of the ciphertext for the first combined data using one or more public keys; generating second combined data by combining the ciphertext for the first combined data, the one or more ciphertexts for the decryption key, and the random bit string; and disclosing the second combined data to one or more entities to share the target data to be shared.

The generating of the ciphertext for the first combined data may include generating the ciphertext for the first combined data using a symmetric key-based encryption algorithm and the decryption key is identical to an encryption key used to generate the ciphertext for the first combined data.

The one or more public keys may be public keys of each of the one or more entities.

The generating of the second combined data may include generating an electronic signature for the second combined data using a secret key and the disclosing of the second combined data may include disclosing the second combined data and the electronic signature to the one or more entities.

In still another general aspect, there is provided an apparatus for sharing data including a data acquirer configured to acquire second combined data in which a ciphertext for first combined data in which target data to be shared and a first random bit string are combined, one or more ciphertexts for a decryption key of the ciphertext for the first combined data, and a second random bit string are combined; a key decryptor configured to use a secret key to decrypt a ciphertext encrypted using a public key that corresponds to the secret key from among the one or more ciphertexts for the decryption key and acquire the decryption key; data decryptor configured to use the acquired decryption key to decrypt the ciphertext for the first combined data and acquire the target data to be shared and the first random bit string; and a data verifier configured to verify the target data to be shared on the basis of the first random bit string and the second random bit string.

The data acquirer may acquire the second combined data and an electronic signature for the second combined data and verify the electronic signature for the second combined data using a public key of an entity that has disclosed the second combined data.

The one or more ciphertexts for the decryption key may be ciphertexts encrypted using public keys of each of entities to share the target data to be shared.

The data verifier may determine that the target data to be shared is verified when the first random bit string is identical to the second random bit string.

In yet another general aspect, there is provided a method of sharing data including acquiring second combined data in which a ciphertext for first combined data in which target data to be shared and a first random bit string are combined, one or more ciphertexts for a decryption key of the ciphertext for the first combined data, and a second random bit string are combined; using a secret key to decrypt a ciphertext encrypted using a public key that corresponds to the secret key from among the one or more ciphertexts for the decryption key and acquiring the decryption key; decrypting the ciphertext for the first combined data using the acquired decryption key and acquiring the target data to be shared and the first random bit string; and verifying the target data to be shared on the basis of the first random bit string and the second random bit string.

The acquiring of the second combined data may include acquiring the second combined data and an electronic signature for the second combined data and verifying the electronic signature for the second combined data by using a public key of an entity that has disclosed the second combined data.

The one or more ciphertexts for the decryption key may be ciphertexts encrypted using public keys of each of the one or more entities to share the target data to be shared.

The verifying of the target data to be shared may include determining that the target data to be shared is verified when the first random bit string is identical to the second random bit string.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
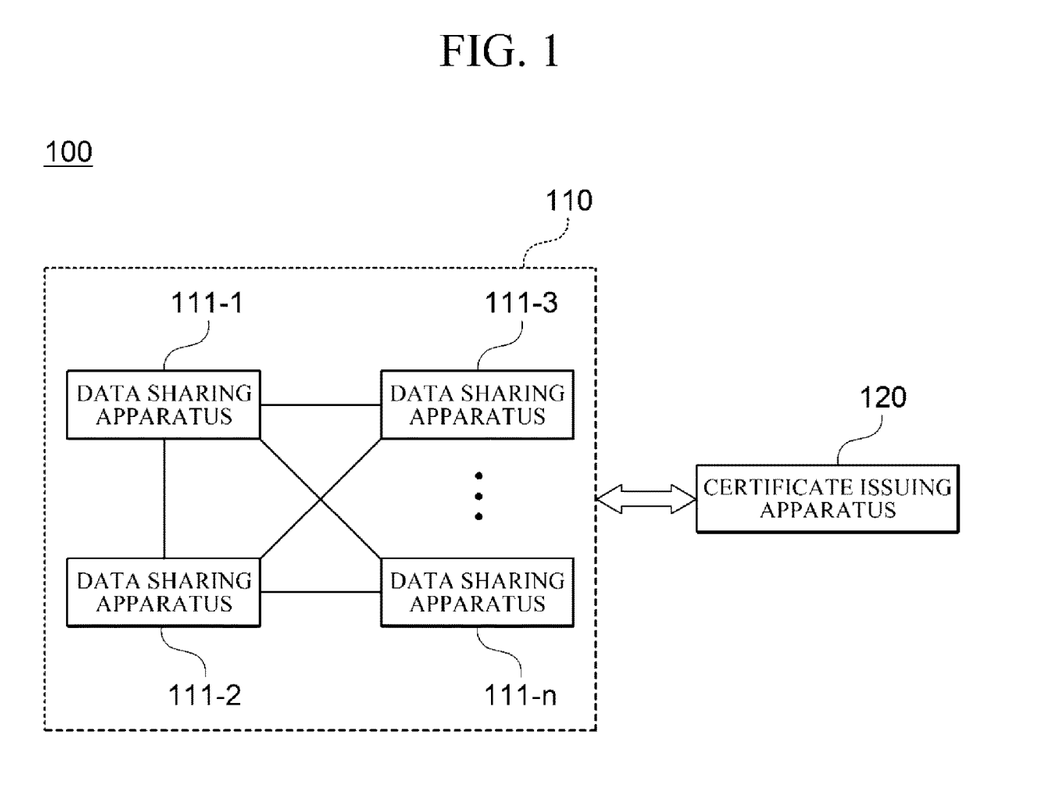
FIG. 1 is a diagram illustrating a configuration of a data sharing system according to one embodiment.

FIG. 1 is a diagram illustrating a configuration of a data sharing system 100 according to one embodiment.

Referring to FIG. 1, the data sharing system 100 includes a plurality of data sharing apparatuses 111-1, 111-2, 111-3, and 111-n for sharing data and a certificate issuing apparatus 120 for issuing a certificate.

The plurality of data sharing apparatuses 111-1, 111-2, 111-3, and 111-n may refer to apparatuses used by each of a plurality of entities participating in a data sharing network 110, such as a blockchain. The plurality of data sharing apparatuses 111-1, 111-2, 111-3, and 111-n may be apparatuses to share encrypted data therebetween using a wired/wireless communication network and may be implemented as various forms of devices, such as, a personal computer (PC), a tablet PC, a smartphone, and the like.

Each of the apparatuses 111-1, 111-2, 111-3, and 111-n for sharing data may generate a secret key and a public key of each entity according to a key generation scheme of a public key-based encryption algorithm. In this case, each of the apparatuses 111-1, 111-2, 111-3, and 111-n for sharing data may safely store the secret key therein and publicly reveal the public key.

Also, each of the data sharing apparatuses 111-1, 111-2, 111-3, and 111-n may provide the public key of each entity to the certificate issuing apparatus 120 using the wired/wireless communication network and may receive a certificate for the public key of each entity issued from the certificate issuing apparatus 120.

The certificate issuing apparatus 120 may refer to an apparatus used by a certification authority or a certification entity that confirms the guarantee of an association between the public key of each entity and the entity that has generated the corresponding public key. Specifically, the certificate issuing apparatus 120 may issue a certificate for the public key of each entity provided from the plurality of the data sharing apparatuses 111-1, 111-2, 111-3, and 111-n. In this case, the certificate for the public key may be information which the certificate issuing apparatus 120 generates by signing with the public key using the secret key of the certificate issuing apparatus 120.

In addition, the certificate issuing apparatus 120 may publicly disclose the issued certificate for the public key of each entity. Accordingly, each of the data sharing apparatuses 111-1, 111-2, 111-3, and 111-n is able to easily obtain the certificate for the public key of other entity from the certificate issuing apparatus 120.

Figure 2:
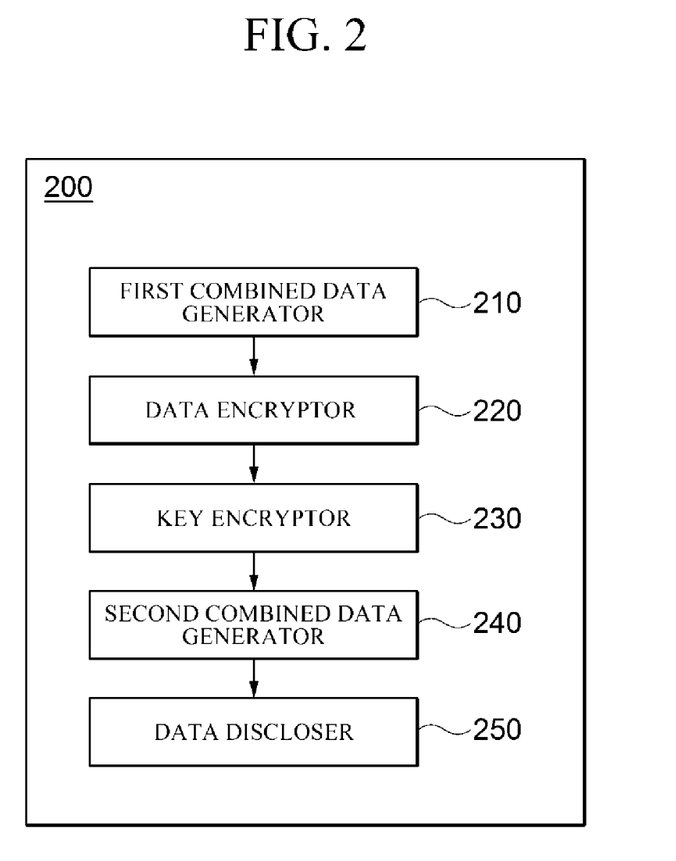
FIG. 2 is a diagram illustrating a configuration of a data sharing apparatus for sharing data according to one embodiment.

FIG. 2 is a diagram illustrating a configuration of a data sharing apparatus 200 for sharing data according to one embodiment.

Referring to FIG. 2, the data sharing apparatus 200 includes a first combined data generator 210, a data encryptor 220, a key encryptor 230, a second combined data generator 240, and a data discloser 250.

The data generator 210 generates first combined data by combining target data to be shared and a random bit string.

In this case, the target data to be shared may mean data that an entity intends to share with one or more other entities.

The random bit string may be information in which bits are enumerated in an arbitrary order. In this case, the random bit string may be set by an entity that intends to share the target data to be shared or may be information arbitrarily that is generated by the data sharing apparatus 200 used by the corresponding entity.

The data encryptor 220 generates a ciphertext for the first combined data.

According to one embodiment, the data encryptor 220 may generate a ciphertext for the first combined data using a symmetric key-based encryption algorithm, such as the advanced encryption standard (AES) algorithm, the data encryption standard (DES) algorithm, or the like, in which an encryption key used for encrypting a plaintext is the same as a decryption key of a ciphertext encrypted using the corresponding encryption key.

The key encryptor 230 generates one or more ciphertexts for a decryption key of ciphertext for the first combined data by using one or more public keys. In this case, the one or more public keys may be public keys of each of one or more entities to share the target data to be shared.

Specifically, the key encryptor 230 may acquire the one or more public keys disclosed by each of the one or more entities to share the target data to be shared. Then, the key encryptor 230 may use each of the obtained public keys of each of the one or more entities to generate one or more ciphertexts. In this case, the one or more ciphertexts may be generated using a public key-based encryption algorithm that uses public keys of each of one or more entities as encryption keys.

The number of ciphertexts generated by the key encryptor 230 may be equal to the number of entities to share the target data to be shared.

According to one embodiment, the key encryptor 230 may verify the public key of each of one or more entities. Specifically, the key encryptor 230 may acquire certificates for each of the one or more entities and a public key of a certificate issuing apparatus 120 from the certificate issuing apparatus 120. Also, the key encryptor 230 may verify the certificates for the public keys for each of the one or more entities using the public key of the certificate issuing apparatus 120.

Accordingly, the key encryptor 230 may confirm the assurance of the certificate issuing apparatus 120 on an association between the one or more public key and the entities that have generated each of the public keys. Then, the key encryptor 230 may generate one or more ciphertexts for a decryption key using the public keys of the one or more entities when verification for the certificate is completed.

The second combined data generator 240 generates second combined data by combining the ciphertext for the first combined data, one or more ciphertexts for a decryption key, and a random bit string. In this case, the random bit string used to generate the second combined data is the same as the random bit string used to generate the first combined data.

In addition, the second combined data generator 240 may generate an electronic signature for the second combined data using a secret key.

Specifically, the second combined data generator 240 may generate the electronic signature for the second combined data using the secret key of an entity to disclose the target data to be shared.

The data discloser 250 discloses the second combined data to one or more entities to share the target data to be shared.

Additionally, according to one embodiment, the data discloser 250 may disclose the electronic signature for the second combined data together with the second combined data to one or more entities.

Figure 3:
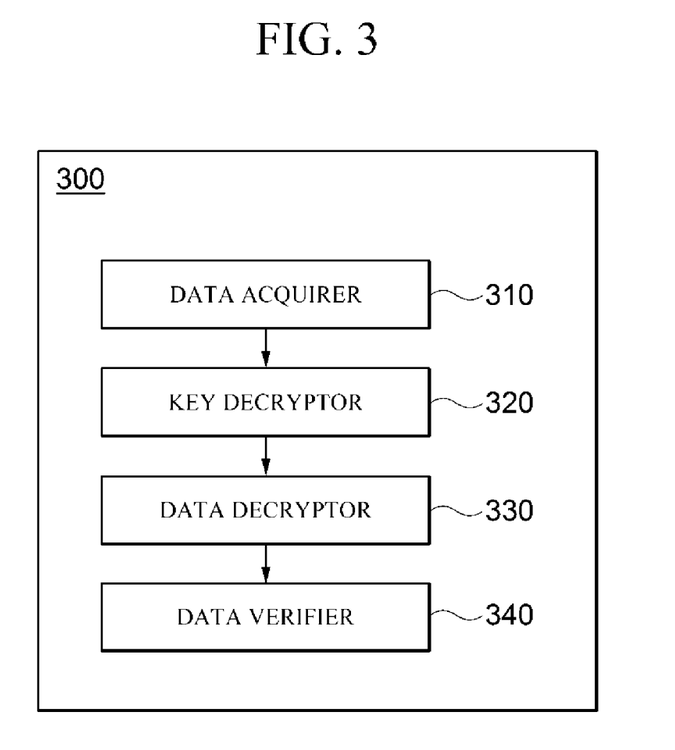
FIG. 3 is a diagram illustrating a configuration of a data sharing apparatus for sharing data according to another embodiment.

FIG. 3 is a diagram illustrating a configuration of a data sharing apparatus 300 for sharing data according to another embodiment.

Referring to FIG. 3, the data sharing apparatus 300 includes a data acquirer 310, a key decryptor 320, a data decryptor 330, and a data verifier 340.

The data acquirer 310 acquires second combined data in which a ciphertext for first combined data in which target data to be shared and a first random bit string are combined, one or more ciphertexts for a decryption key of the ciphertext for the first combined data, and a second random bit string are combined.

In this case, the one or more ciphertexts for the decryption key may be a ciphertext that is encrypted using public keys of each of entities to share the target data to be shared.

Also, the data acquirer 310 may extract and acquire the ciphertext for the first combined data, the one or more ciphertexts for the decryption key, and the second random bit string from the second combined data.

According to one embodiment, the data acquirer 310 may acquire the second combined data and an electronic signature for the second combined data and verify the electronic signature for the second combined data using a public key for the entity that has disclosed the second combined data. In this case, the electronic signature for the second combined data may be information in which the second combined data is signed using a secret key of the entity that has disclosed the second combined data.

According to one embodiment, the data acquirer 310 may verify the public key of the entity that has disclosed the second combined data. Specifically, the data acquirer 310 may acquire both a certificate for the public key of the entity that has disclosed the second combined data and a public key of a certificate issuing apparatus 120 from the certificate issuing apparatus 120. Then, the data acquirer 310 may use the public key of the certificate issuing apparatus 120 to verify the certificate for the public key of the entity that has disclosed the second combined data.

Accordingly, the data acquirer 310 may confirm the assurance of the certificate issuing apparatus 120 on an association between the entity that has disclosed the second combined data and the public key of the entity that has disclosed the second combined data.

The key decryptor 320 acquires the decryption key by decrypting a ciphertext that is encrypted using a public key that corresponds to the secret key from among the one or more ciphertexts for the decryption key.

In this case, the one or more ciphertexts for the decryption key may be decrypted using a public key-based encryption algorithm that uses secret keys of each of one or more entities as decryption keys. That is, the key decryptor 320 may use a secret key of an entity intending to acquire the target data to be shared to decrypt a ciphertext that is encrypted by a public key paired with the secret key of the entity intending to acquire the target data from among the ciphertexts for the decryption key, thereby acquiring the decryption key.

The data decryptor 330 uses the acquired decryption key to decrypt a ciphertext for the first combined data and acquires the target data to be shared and the first random bit string.

The data decryptor 330 may decrypt the ciphertext for the first combined data using a symmetric key-based encryption algorithm, such as AES algorithm, DES algorithm, or the like, in which an encryption key used for encrypting a plaintext is the same as a decryption key of a ciphertext encrypted using the corresponding encryption key.

Specifically, the data decryptor 330 may use the acquired decryption key to decrypt the ciphertext for the first combined data and acquire the first combined data. Also, the data decryptor 330 may extract and acquire the target data to be shared and the first random bit string from the acquired first combined data.

The data verifier 340 verifies the target data to be shared on the basis of the first random bit string and the second random bit string.

Specifically, the data verifier 340 may verify the target data to be shared on the basis of the first random bit string extracted from the first combined data and the second random bit string extracted from the second combined data.

According to one embodiment, the data verifier 340 may determine that the target data to be shared is verified when the first random bit string is identical to the second random bit string.

Figure 4:
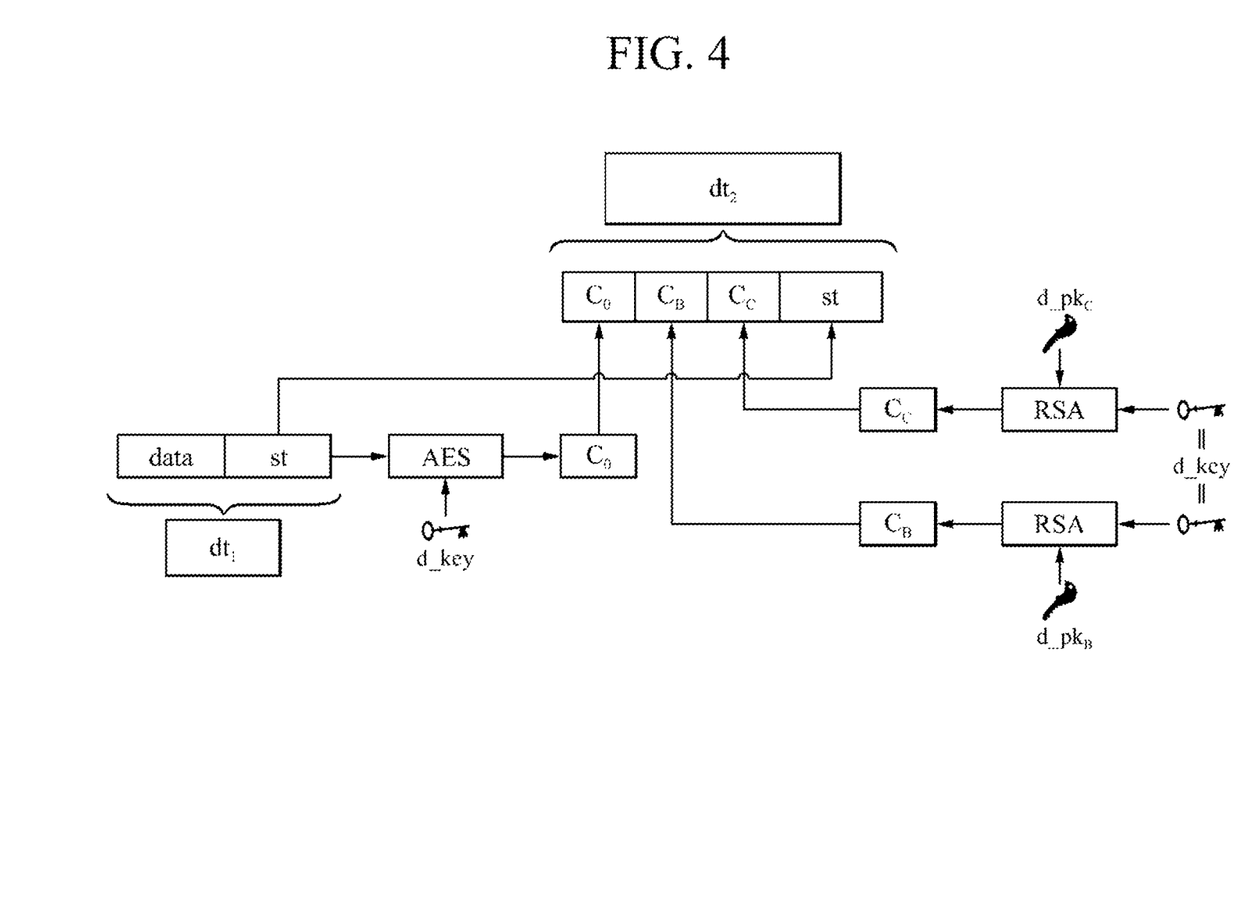
FIG. 4 is a diagram illustrating an example in which data is shared in a blockchain network according to one embodiment.

FIG. 4 is a diagram illustrating an example in which data is shared in a blockchain network according to one embodiment.

Referring to FIG. 4, it is assumed that entity A among a plurality of entities participating in a blockchain network intends to disclose transaction data obtainable only by entity B and entity C in the blockchain network.

First, a data sharing apparatus 200 for sharing data acquires certificates for each public key $d\_pk_B$ and $d\_pk_C$ of each of entities B and C from a certificate issuing apparatus 120.

Then, the data sharing apparatus 200 uses a public key of the certificate issuing apparatus 120 to verify the certificates for each public key $d\_pk_B$ and $d\_pk_C$ of each of entities B and C.

After the verification of the certificates for the public keys $d\_pk_B$ and $d\_pk_C$ of entities B and C is completed, the data sharing apparatus 200 generates first combined data $dt_1$=datalist by combining target data to be shared and a random bit string st selected by entity A.

Then, the data sharing apparatus 200 uses an encryption key d_key of entity A to generate ciphertext $C_0$=ENC(d_key, $dt_1$) for the first combined data $dt_1$.

In this case, the generation of the ciphertext $C_0$ for the first combined data may be performed using a symmetric key-based encryption algorithm, such as AES algorithm, DES algorithm, or the like, in which an encryption key used for encrypting plaintext is identical to a decryption key of a ciphertext encrypted using the corresponding encryption key.

Then, the data sharing apparatus 200 uses each of the public keys $d\_pk_B$ and $d\_pk_C$ of each of entities B and C to generate one or more ciphertexts $C_B$=ENC($d\_pk_B$, d_key) and $C_C$=ENC($d\_pk_C$, d_key) for a decryption key d_key of the ciphertext $C_0$ for the first combined data. In this case, the decryption key d_key is identical to the encryption key d_key used to generate the ciphertext for the first combined data.

Meanwhile, the generation of the one or more ciphertexts $C_B$ and $C_C$ for the decryption key may be performed through an encryption algorithm, such as Rivest-Shamir-Adleman (RSA) algorithm or the like.

Then, the data sharing apparatus 200 generates second combined data $dt_2=C_0\|C_B\|C_C\|st$ by combining the ciphertext $C_0$ for the first combined data, the one or more ciphertexts $C_B$ and $C_C$ for the decryption key, and the random bit string st used to generate the first combined data.

Then, the data sharing apparatus 200 uses a secret key $s\_sk_A$ of entity A to generate an electronic signature X=SIGN($s\_sk_A$, $dt_2$) for the second combined data.

Then, the data sharing apparatus 200 discloses the second combined data $dt_2$ and the electronic signature X for the second combined data to entity B and entity C.

The subsequent process is the same as the process performed in the existing private blockchain.

Meanwhile, it is assumed that entity B and entity C intend to acquire the transaction data disclosed by entity A in the blockchain network.

First, the data sharing apparatus 300 acquires a certificate for a public key $s\_pk_A$ of entity A from the certificate issuing apparatus 120.

Then, the data sharing apparatus 300 verifies the certificate for the public key $s\_pk_A$ of entity A using the public key of the certificate issuing apparatus 120.

When the verification of the certificate for the public key $s\_pk_A$ of entity A is complete, the data sharing apparatus 300 acquires the second combined data dt2 disclosed by entity A and the electronic signature X for the second combined data.

Then, the data sharing apparatus 300 verifies the electronic signature X for the second combined data using the public key $s\_pk_A$ of entity A (Verify($s\_pk_A$, X)).

At this time, the data sharing apparatus 300 acquires the ciphertext $C_0$ for the first combined data, the one or more ciphertexts $C_B$ and $C_C$ for the decryption key for the first combined data, and the second random bit string $st_2$ from the second combined data $dt_2$.

Then, the data sharing apparatus 300 uses a secret key to decrypt a ciphertext encrypted using a public key that corresponds to the secret key from among the one or more ciphertexts.

Specifically, in the case of entity B, the data sharing apparatus 300 uses a secret key $d\_sk_B$ of entity B to decrypt the ciphertext $C_B$ for a decryption key encrypted using the public key $d\_pk_B$ corresponding to the secret key $d\_sk_B$ of entity B. Also, in the case of entity C, the data sharing apparatus 300 uses a secret key $d\_sk_C$ of entity C to decrypt the ciphertext $C_C$ for a decryption key encrypted using the public key $d\_pk_C$ corresponding to the secret key $d\_sk_C$ of entity C.

In this case, the data sharing apparatus 300 acquires a decryption key d_key=DEC($d\_sk_B$, $C_B$), DEC($d\_sk_C$, $C_C$) by decrypting the ciphertext for the decryption key.

Thereafter, the data sharing apparatus 300 uses the decryption key d_key to decrypt the ciphertext $C_0$ for the first combined data and acquires the first combined data $dt_1$=DEC(d_key, $C_0$).

In this case, the decryption of the ciphertext $C_0$ for the first combined data may be performed using a symmetric key-based encryption algorithm, such as AES algorithm, DES algorithm, or the like, in which an encryption key used for encrypting a plaintext is identical to a decryption key of a ciphertext encrypted using the corresponding encryption key.

Then, the data sharing apparatus 300 acquires the target data to be shared and the first random bit string $st_1$ from the acquired first combined data $dt_1$.

Then, the data sharing apparatus 300 determines that the target data to be shared is verified when the first random bit string $st_1$ is identical to the second random bit string $st_2$.

Figure 5:
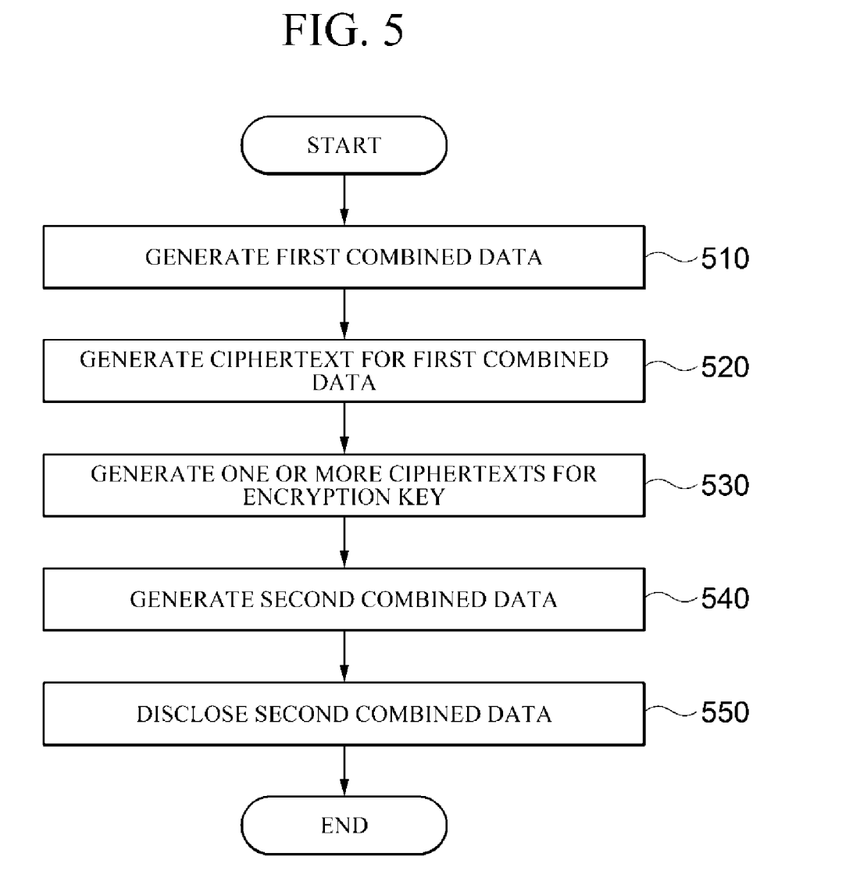
FIG. 5 is a flowchart illustrating a method of sharing data according to one embodiment.

FIG. 5 is a flowchart illustrating a method of sharing data according to one embodiment.

The method illustrated in FIG. 5 may be performed by the data sharing apparatus 200 shown in FIG. 2.

Referring to FIG. 5, the data sharing apparatus 200 generates first combined data by combining target data to be shared and a random bit string (510).

Then, the data sharing apparatus 200 generates a ciphertext for the first combined data (520).

In this case, the data sharing apparatus 200 may use a symmetric key-based encryption algorithm to generate the ciphertext for the first combined data.

Then, the data sharing apparatus 200 uses one or more public keys to generate one or more ciphertexts for a decryption key of the ciphertext for the first combined data (530).

Then, the data sharing apparatus 200 generates second combined data by combining the ciphertext for the first combined data, the one or more ciphertexts for the decryption key, and a random bit string (540).

In this case, the data sharing apparatus 200 may generate an electronic signature for the second combined data using a secret key.

Then, the data sharing apparatus 200 discloses the second combined data to one or more entities to share the target data to be shared (550).

In this case, the data sharing apparatus 200 may disclose the second combined data and the electronic signature to one or more entities.

Figure 6:
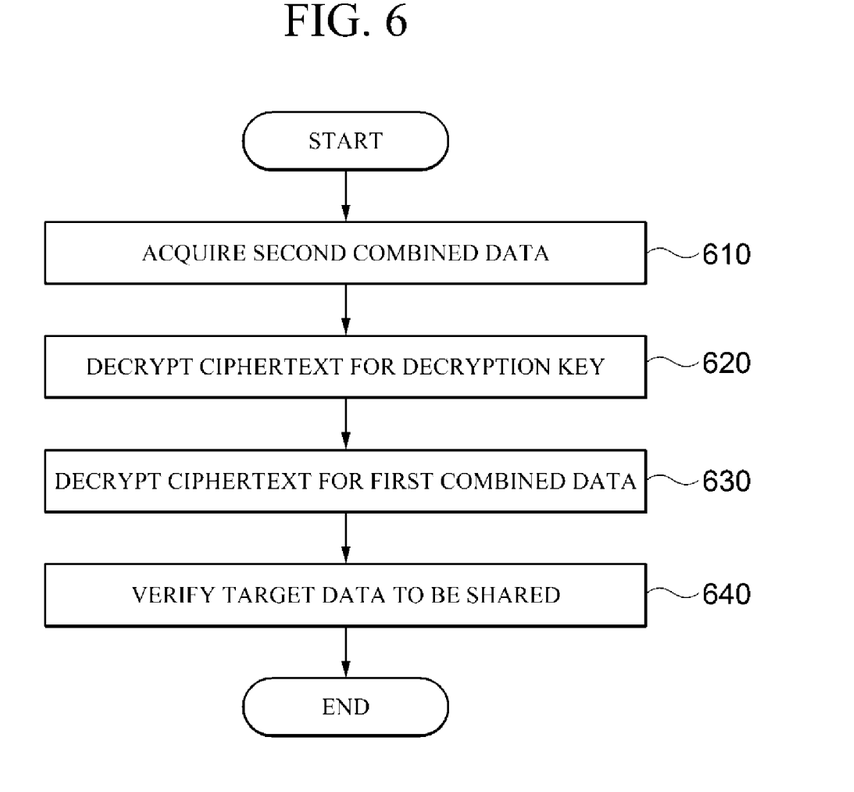
FIG. 6 is a flowchart illustrating a method of sharing data according to another embodiment.

FIG. 6 is a flowchart illustrating a method of sharing data according to another embodiment.

The method illustrated in FIG. 6 may be performed by the data sharing apparatus 300 shown in FIG. 3.

Referring to FIG. 6, the data sharing apparatus 300 acquires second combined data in which a ciphertext for first combined data in which target data to be shared and a first random bit string are combined, one or more ciphertexts for a decryption key of the ciphertext for the first combined data, and a second random bit string are combined (610).

In this case, the data sharing apparatus 300 may acquire the second combined data and an electronic signature for the second combined data.

Also, the data sharing apparatus 300 may verify the electronic signature for the second combined data using a public key of an entity that has disclosed the second combined data.

Then, the data sharing apparatus 300 uses a secret key to decrypt a ciphertext encrypted using a public key that corresponds to the secret key from among the one or more ciphertexts for the decryption key and acquires the decryption key (620). Then, the data sharing apparatus 300 uses the acquired decryption key to decrypt the ciphertext for the first combined data and acquires the target data to be shared and the first random bit string (630).

Then, the data sharing apparatus 300 verifies the target data to be shared on the basis of the first random bit string and the second random bit string (640).

In this case, the data sharing apparatus 300 may determine that the target data to be shared is verified when the first random bit string is identical to the second random bit string.

Meanwhile, in the flowcharts illustrated in FIGS. 5 and 6, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 7:
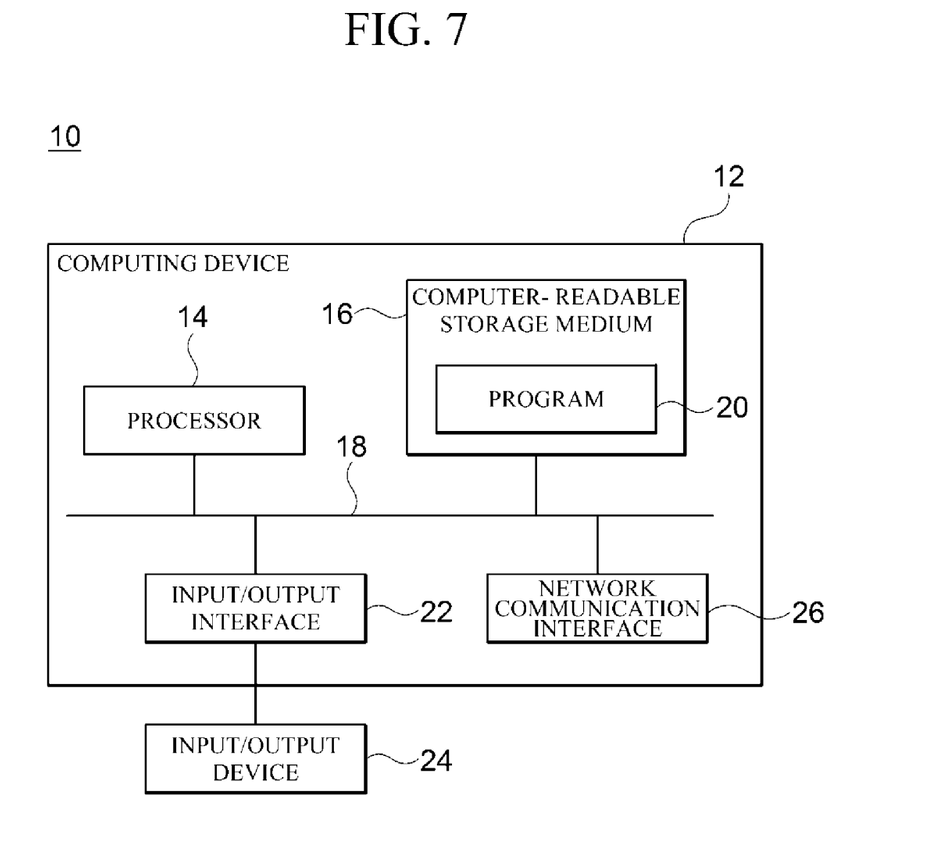
FIG. 7 is a block diagram for describing a computing environment including a computing device suitable to be used in exemplary embodiments.

FIG. 7 is a block diagram for describing a computing environment including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be one or more components included in, for example, the data sharing apparatuses 200 and 300 illustrated in FIGS. 2 and 3.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The program 20 stored in the computer readable storage medium 16 may include a set of commands executable by the processor 14. In one embodiment, the computer readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

According to the disclosed embodiments, data is shared using a public key and a secret key of an entity to share the data so that only some intended entities among entities on a data sharing network, such as a blockchain, can confirm and verify the data on the network.

Also, according to the disclosed embodiments, data is verified using a first random bit string included in first combined data and a second random bit string included in second combined data, so that identity of an entity that has generated and protected data and an entity that signs a signature can be ensured, thereby preventing loss of reliability of a data sharing network, such as a blockchain.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for sharing data, comprising one or more hardware processors configured to:
   generate first combined data by combining target data to be shared and a random bit string;
   generate a ciphertext for the first combined data;
   generate one or more ciphertexts for a decryption key of the ciphertext for the first combined data using a public key of each of one or more entities to share the target data;
   generate second combined data by combining the ciphertext for the first combined data, the one or more ciphertexts for the decryption key, and the random bit string used to generate the first combined data;
   generate an electronic signature for the second combined data using a secret key; and
   disclose the second combined data and the electronic signature to the one or more entities to share the target data to be shared,
   wherein each of the random bit string included in the first combined data and the second combined data is used to verify the target data;
   a number of the one or more ciphertexts is equal to the number of entities to share the target data to be shared; and
   the target data to be shared can be verified when the random bit string used to generate the second combined data is identical to the random bit string used to generate the first combined data.

2. The apparatus of claim 1, wherein the one or more hardware processors are further configured to generate the ciphertext for the first combined data using a symmetric key-based encryption algorithm and the decryption key is identical to an encryption key used to generate the ciphertext for the first combined data.

3. A method of sharing data, comprising:
   generating first combined data by combining target data to be shared and a random bit string;
   generating a ciphertext for the first combined data;
   generating one or more ciphertexts for a decryption key of the ciphertext for the first combined data using a public key of each of one or more entities to share the target data;
   generating second combined data by combining the ciphertext for the first combined data, the one or more ciphertexts for the decryption key, and the random bit string used to generate the first combined data;
   generating an electronic signature for the second combined data using a secret key; and
   disclosing the second combined data and the electronic signature to the one or more entities to share the target data to be shared,
   wherein each of the random bit string included in the first combined data and the second combined data is used to verify the target data;
   a number of the one or more ciphertexts is equal to the number of entities to share the target data to be shared; and
   the target data to be shared can be verified when the random bit string used to generate the second combined data is identical to the random bit string used to generate the first combined data.

4. The method of claim 3, wherein the generating of the ciphertext for the first combined data comprises generating the ciphertext for the first combined data using a symmetric key-based encryption algorithm and the decryption key is identical to an encryption key used to generate the ciphertext for the first combined data.

* * * * *